March 13, 1962

R. K. OWEN 3,025,074

GOLF CART

Filed Dec. 7, 1959

INVENTOR.
ROBERT K. OWEN

BY

*Jerry J. Dunlap*

ATTORNEY

INVENTOR.
ROBERT K. OWEN
BY
ATTORNEY

March 13, 1962

R. K. OWEN 3,025,074

GOLF CART

Filed Dec. 7, 1959

INVENTOR.
ROBERT K. OWEN
BY
*Jerry J. Dunlap*
ATTORNEY

United States Patent Office 3,025,074
Patented Mar. 13, 1962

3,025,074
GOLF CART
Robert K. Owen, 2621 NW. 34th St., Oklahoma City, Okla.
Filed Dec. 7, 1959, Ser. No. 857,785
11 Claims. (Cl. 280—42)

This invention relates generally to improvements in devices of the type for use by a golfer in carrying golf clubs around a golf course, and more particularly, but not by way of limitation, to what may be considered an improved combination golf bag and cart. This is a continuation-in-part of my copending application entitled Golf Cart, filed July 24, 1958, Ser. No. 750,715, now abandoned.

As it is well known in the art, several different designs of golf carts have been devised and are presently on the market. The most popular types of golf carts are ordinarily constructed to support a golf bag containing a set of golf clubs in such a manner that the golf bag may be easily conveyed around a golf course. Generally speaking, these present day golf carts are provided with a pair of wheels attached to the framework of the golf cart in such a manner that the wheels may be collapsed toward one another for storage of the cart, and may be expanded for a normal use of the cart. It may also be noted that several workers in the art have conceived of a combination golf bag and cart constructed as a single device. However, these combination golf bags and carts are not in widespread use.

The present day golf carts having collapsible-type wheel mechanisms have, as indicated above, received widespread use by golfers. However, these present day golf carts have several disadvantages which limit their attractiveness and utility. For example, these prior golf carts are usually relatively easily tipped over (that is, they are unstable) when the cart is pulled over rather rough terrain, and the wheel mechanisms of the carts are difficult to operate. Several prior designs have attempted to allow an expansion or outward movement of the wheels, and a contraction of the wheels toward one another, by providing an actuating block on the wheel supporting mechanism which the golfer may force either upwardly or downwardly. However, the present day wheel mechanism constructions are difficult to operate and ordinarily require a substantial amount of effort for expanding or collapsing the wheels. Another disadvantage in present day golf carts is the lack of the provision of a seat on the cart which may be used by a golfer while waiting on a golf course, without unduly increasing the size of the cart. Furthermore, present day golf carts are not provided with sufficient strength to allow the golfer to sit on the cart while waiting on a golf course.

The present invention contemplates a novel golf cart construction which includes a seat for a golfer when the golf cart is tilted rearwardly and which does not increase the overall size of the cart in any manner. The present invention also contemplates a novel wheel mechanism wherein the wheels are retracted or expanded by the golfer merely pressing downwardly or pulling upwardly with his foot on a wheel actuating block of the wheel mechanism. Furthermore, the present invention contemplates a novel wheel mechanism having the maximum stability and strength and which may be easily utilized to withstand the weight of a golfer sitting on the cart.

In a preferred embodiment, the present invention may be defined as the combination of: a substantially vertically extending back member having a front face and a rear face; means carried by the back member and extending forwardly from the back member for supporting a set of golf clubs; a pair of spaced wheels; an axle mounting for each wheel; first brace means pivotally connected to the back member and to each of said axle mountings for guiding the axle mountings rearwardly and outwardly from the back member and, alternately, inwardly and forwardly against the back member; a wheel actuating block slidingly secured to the back member for movement vertically along the back member; and second brace means pivotally connected to the wheel actuating block and to each axle mounting for moving the wheels rearwardly and, alternately, forwardly upon sliding of the block downwardly and, alternately, upwardly along the back member, each of said second brace means being pivotally connected to the wheel actuating block at a point forwardly of the pivotal connection thereof to the respective axle mounting when the axle mountings are in contact with the back member and the back member is extended vertically, to provide a rearward component of force on the axle mountings when the wheel actuating block is initially moved downwardly along the back member.

An important object of this invention is to provide a golf cart having a collapsible wheel mechanism which may be easily operated. More specifically, it is an object of this invention to provide such a wheel mechanism which a golfer may operate with one foot and with a minimum of effort.

Another object of this invention is to provide a golf cart which may be utilized as a seat by a golfer, without damage either to the cart or to clubs carried by the cart, and without increasing the overall size of the cart.

A further object of this invention is to provide a novel golf cart having the maximum stability during use, that is, a golf cart which may not be easily tipped over when operated on a rough terrain.

Another object of this invention is to provide a combination golf bag and cart wherein the golf clubs are carried in the most convenient positions for access by the golfer, and wherein all of the accessories normally required by a golfer may be easily stored during a golf game.

A still further object of this invention is to provide a novel combination golf bag and cart wherein the cover of the bag portion may be easily changed by a golfer.

Another object of this invention is to provide a novel golf cart construction utilizing a wheel mechanism which will be automatically locked when the wheels are expanded, and wherein the cart may be pulled or pushed when the wheels are either in their expanded or retracted positions. Also, it is an object of this invention to provide a wheel mechanism for a golf cart which has the maximum strength.

A further object of this invention is to provide a novel golf cart which is simple in construction, may be economically manufactured and which will have a long service life.

Other objects and advantages of the invention will be evident from the following detailed description, when read in conjunction with the accompanying drawings which illustrate my invention.

Figure 1:
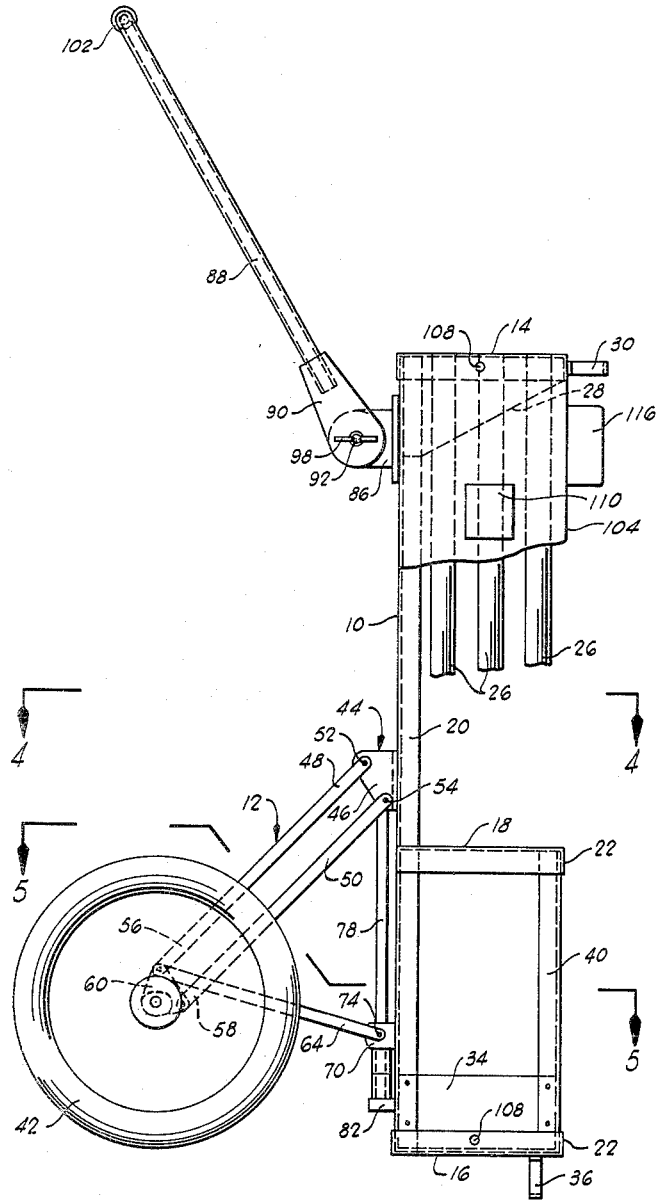
FIGURE 1 is a side elevational view of a golf cart constructed in accordance with this invention, with a portion of the cover of the cart being removed and with a portion of the club supporting tubes being removed to illustrate details of construction.
Figure 6:
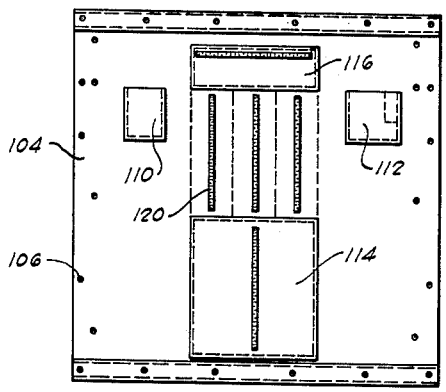

FIGURE 6 is an elevational view of the cover of the cart shown in FIG. 1, with the cover being laid out flat to illustrate details of construction.

Figure 7:
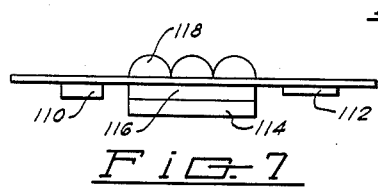

FIGURE 7 is an end view of the cover shown in FIG. 6.

Figure 8:
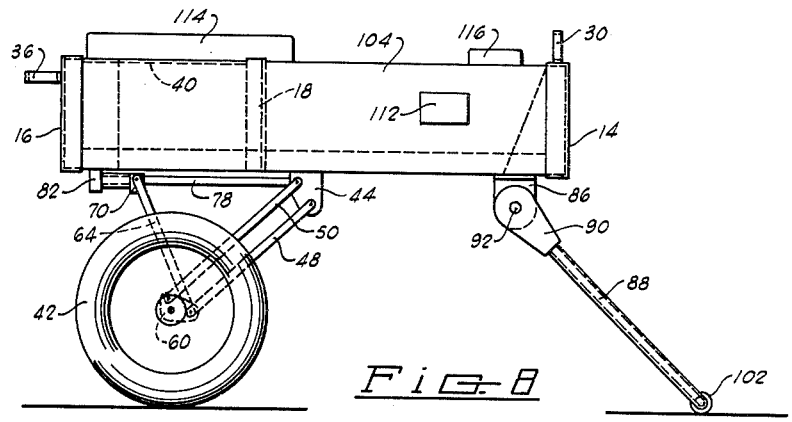

FIGURE 8 is a side elevational view of my novel golf cart tilted rearwardly to a horizontal position where it may be utilized as a seat by a golfer.

Referring to the drawings in detail, and particularly FIG. 1, reference character 10 designates the main support or back member of my golf cart which is normally supported in a substantially vertical position by a wheel mechanism, generally designated by reference character 12. The back member 10 is utilized to support a top plate 14, a bottom plate 16 and an intermediate plate 18 in vertically spaced relation, for purposes which will be described. It may also be noted here that the back member 10 may be of any desired cross sectional construction which has the necessary strength, but is preferably in the form of an extrusion having forwardly extending flanges 20, as shown most clearly in FIGS. 4 and 5, for the maximum strength.

Figure 3:
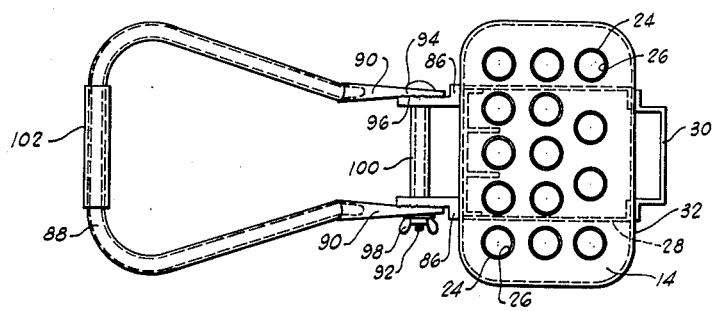
FIGURE 3 is a top view of the cart shown in FIG. 1.
Figure 4:
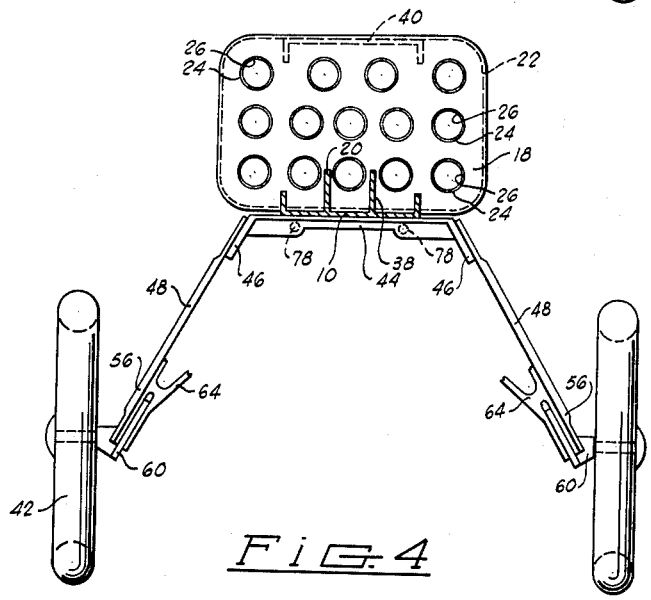
FIGURE 4 is a sectional view as taken along lines 4—4 of FIG. 1.

Each of the plates 14, 16 and 18 (FIG. 1) is preferably dished to provide a circumferentially extending flange 22 around the periphery thereof, and the plates 14 and 18 are turned with the flanges 22 extending downwardly, while the bottom plate 16 is turned with its flange 22 extending upwardly. Also, the top plate 14 and intermediate plate 18 are each provided with a plurality of apertures 24 therein, as shown in FIGS. 3 and 4, to receive golf club supporting tubes 26. There are fourteen of the apertures 24 provided in each of the plates 14 and 18 and these apertures are arranged in three rows. The forwardmost row of apertures 24 and tubes 26 are provided to support the four woods of a set of golf clubs (not shown), and the other two rows of apertures 24 and tubes 26 are provided with five apertures and tubes each to support the irons of a set of golf clubs. The tubes 26 extend through both of the plates 14 and 18 to rest (not shown) on the bottom plate 16, and are of such lengths that the handles of the golf clubs are telescoped completely into these tubes. Therefore, the grips and handles of the golf clubs will be fully protected by the tubes 26, yet the clubs will be in the most convenient arrangement for use by a golfer.

The top plate 14 is secured to the upper end of the back member 10 in any desired manner, such as by welding, and is supported in the desired position by braces 28 at each side of the back member 10, as illustrated in FIG. 3. It may also be noted that the top plate 14 is extended over the upper end of the back member 10 and rests on the upper end of the flanges 20 for the necessary support of the plate. Furthermore, a U-shaped handle 30 is preferably secured to the forward edge 32 of the top plate 14 to facilitate the manipulation of the golf cart during use, as will be described.

Figure 5:
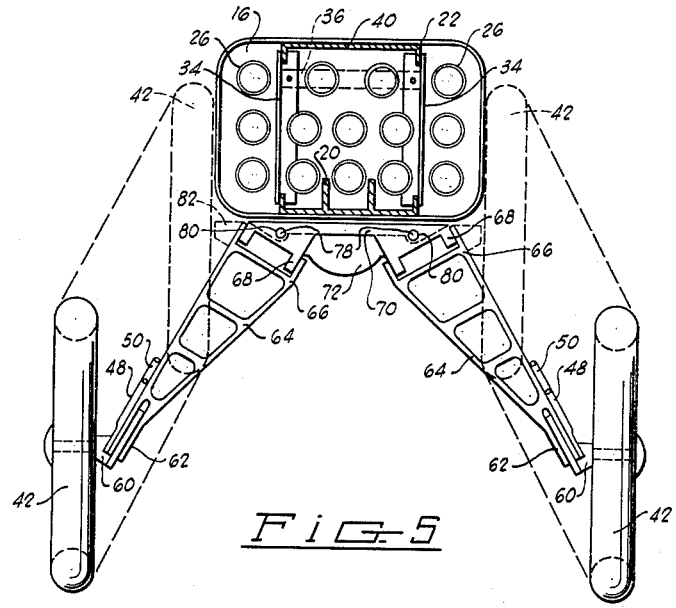
FIGURE 5 is a sectional view as taken along lines 5—5 of FIG. 1 and illustrating the movement of the wheels in dashed lines.

The bottom plate 16 is extended upwardly over the lower end of the back member 10, as illustrated in FIGS. 1 and 5, and is supported on the back member 10 by the use of suitable braces 34 at the opposite sides of the back member 10. Also, a foot piece or support 36 is secured to the lower face of the bottom plate 16 to cooperate with the wheel mechanism 12 in supporting the golf cart when the golf cart is in an upright position, as will be described. The foot piece 36 may be of any desired construction, but is preferably U-shaped to also serve as a handle in loading the cart into and out of a car or the like, as well also be described below.

The middle plate 18 is suitably secured to the medial portion of the back member 10 and extends forwardly from the back member 10 parallel with the plate 14 and 16. It may also be noted that the intermediate plate 18 is provided with slots 38 (see FIG. 4) arranged to receive the forwardly extending flanges 20 of the back member 10. It should also be noted here that the flanges 20 and slots 38 are arranged between the apertures 24 and tubes 26 in the rearmost row of apertures and tubes, such that no interference between the tubes 26 and the flanges 20 will occur.

As shown in FIGS. 1 and 5, a seat plate 40 is secured between the forward portions of the bottom plate 16 and the intermediate plate 18, parallel with the back member 10. The seat plate 40 may be of any desired cross-section, but is preferably in the form of a channel-shaped member, as illustrated in FIG. 5, and extends upwardly inside the circumferential flange 22 of the intermediate plate 18 and downwardly inside the circumferential flange 22 of the bottom plate 16. The seat plate 40 may be secured to the plates 16 and 18 in any desired manner, such as by welding, such that any force imposed on the seat plate 40 will be transmitted through the plates 16 and 18 to the back member 10, as will be described, and no force will be imposed on the tubes 26.

The wheel mechanism 12 basically comprises two sets of brace structures pivotally supporting each wheel 42 to the lower portion of the back member 10. An upper bracket 44 is secured to the medial portion of the back member 10 opposite the plates 14, 16 and 18 and is provided with a pair of rearwardly and outwardly extending flanges 46, as is most clearly shown in FIG. 4. A pair of tubes 48 and 50 (see also FIG. 1) are pivotally secured to each of the flanges 46 to extend rearwardly and outwardly from the back member 10. Each tube 48 of each pair of tubes is pivotally secured to the respective flange 46 on an axis 52 positioned upwardly and rearwardly of the axis 54 of the mating tube 50. It may also be noted here that all of the tubes 48 and 50 are of equal lengths.

The outer ends 56 and 58 of each pair of tubes 48 and 50 are pivotally secured to an axle mounting 60 of the respective wheel 42. Each axle mounting 60 is shaped to support the respective wheel 42 in a vertical position when the axle mounting is connected to the respective tubes 48 and 50. This disposition of each wheel 42 is maintained since the tubes 48 and 50 form the opposite sides of a parallelogram defined by the tubes 48 and 50, the bracket 44 and the respective axle mounting 60. With this construction, each pair of tubes 48 and 50 move in a vertical plane when pivoted around the axes 52 and 54 (as will be described), hence the wheels 42 remain vertical.

Each axle mounting 60 is also pivotally connected to the outer, smaller end 62 of a substantially V-shaped truss 64, as is shown most clearly in FIGS. 1 and 5. Each truss 64 is pivotally secured to the respective axle mounting 60 on the same pivotal axis as the mating tube 48 previously described. The forward, larger end 66 of each truss 64 is pivotally secured to an outwardly and rearwardly extending projection 68 of a wheel actuating block 70. The wheel actuating block 70 is slidingly secured to the back member 10 (as will be described below) and is provided with an outwardly extending flange portion 72 for the convenience of a golfer, such that the golfer can use his foot on the flange 72 to slide the wheel actuating block 70 vertically along the back member 10 for actuating the wheels 42. It should also be noted here, and as is shown most clearly in FIG. 2, the inner end 66 of each truss 64 is pivotally secured to the wheel actuating block 70 along a horizontal axis 74 which is positioned directly below the pivotal axis 54 of the mating tube 50. It may be further noted that this axis 74 is forward of the axis 76 at the opposite end of the respective truss 64, such that the truss 64 extends downwardly and slightly rearwardly from the back member 10 when the tubes 48 and 50 are extended vertically along the back member 10 and when the wheels 42 are collapsed to their closed positions. Thus, a downward force on the block 70 will have a rearward component transmitted through each truss 64 to initiate the rearward and outward movement of the wheels 42.

Figure 2:
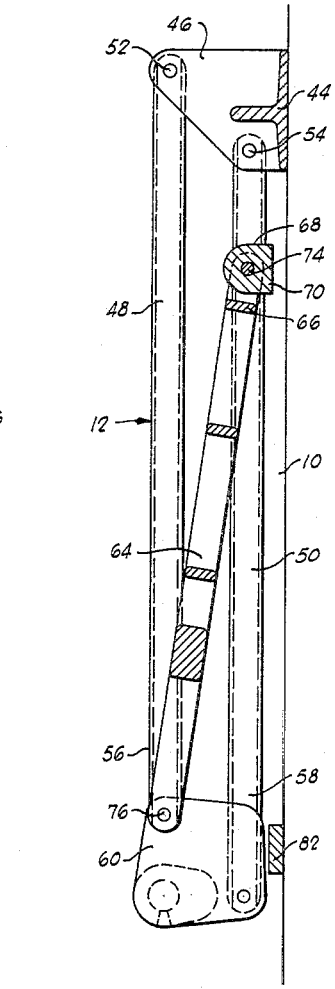
FIGURE 2 is an enlarged detailed view taken in section through the wheel mechanism of the cart shown in FIG. 1 and illustrating the position of the mechanism when the wheels are in a collapsed position.

The wheel actuating block 70 is slidingly secured to the back member 10 by means of a pair of guide or slide rods 78 extending through mating apertures 80 in the wheel actuating block. The upper ends of the slide rods 78 are suitably secured to the bracket 44, and the lower ends of the slide rods 78 are suitably secured to a stop member 82 (see FIG. 1), with the stop member 82 being, in turn, rigidly connected to the back member 10 near the lower end of the back member 10. It may also be noted here that the stop 82 is so located that the trusses 64 are extended slightly downwardly and forwardly from the axle mountings 60 when the wheel actuating block 70 is in contact with the stop 82 and when the back member 10 is extended vertically as shown in FIG. 1. In other words, the trusses 64 are moved "over center" during downward movement of the wheel actuating block 70, such that any load imposed on the wheels 42 will simply tend to force the wheel actuating block 70 tighter into contact with the stop member 82, and the wheels 42 will be locked in their expanded positions. Furthermore, when the wheel actuating block 70 is moved upwardly to its uppermost position directly below the bracket 44, as shown in FIG. 2, the axle mountings 60 will be moved into contact with the stop member 82 and the tubes 48 and 50 will be extended parallel with the back member 10.

As shown in FIGS. 1 and 3, a pair of opposite hand, handle brackets 86 are rigidly secured to the rear face of the back member 10 adjacent the upper end of the back member. A U-shaped handle 88 is secured to the handle brackets 86 by means of connectors 90 on the free ends of the handle 88. The connectors 90 are pivotally secured to the handle brackets 86 by means of a bolt 92 passing through mating apertures (not shown) in the outer ends of the connectors 90 and the handle brackets 86. Therefore, the handle 88 may be pivoted vertically with respect to the back member 10 around the axis of the bolt 92. However, the mating faces 94 and 96 of the connectors 90 and handle brackets 86, respectively, are serrated, such that the handle 88 will remain fixed in any position in which it is placed. A wing nut 98 is threaded onto one end of the bolt 92 to press the connectors 90 against the handle brackets 86 when the handle 88 is positioned at the desired angle from the back member 10 to rigidly engage the serrations in the faces 94 and 96. It may be further noted that a spacer tube 100 is telescoped over the bolt 92 between the handle brackets 86 to prevent the handle brackets 86 from becoming bent when the wing nut 98 is tightened to an excessive degree. If desired, any suitable grip 102 may be provided around the medial portion of the handle 88 for the convenience of the golfer gripping the handle 88 and pulling the golf cart.

The present invention also contemplates a novel cover 104 which is shown in detail in FIGS. 6 and 7. The cover 104 is formed of any suitable fabric-like material and is substantially rectangular in configuration when laid flat as illustrated in FIG. 6. Suitable fasteners 106 are provided around the edges of the cover 104 for connection with mating fasteners 108, only two of which are shown (see FIG. 1), on the plates 14, 16 and 18 and the back member 10. The cover 104 is of a size to extend around the front and sides of the plates 14, 16 and 18 and over the rear face of the back member 10. Therefore, the cover 104 completely encloses the plates 14, 16 and 18 and the tubes 26 to provide an attractive appearing golf cart. It may also be noted here that the cover 104 is secured around the plates 14, 16 and 18 and the back member 10 by removing the various brackets from the back member 10 and then the various brackets are attached back on the back member 10 through the cover 104.

Suitable pockets 110 and 112 are provided on the outer face of the cover 104 in positions to extend from the opposite sides of the golf cart when the cover 104 is secured in the desired position. Additional pockets 114 and 116 also extend from the outer face of the cover 104 along the forward end of the golf cart, as illustrated in FIG. 8.

It will be understood that the pockets 110, 112, 114 and 116 may be of any desired sizes to contain the various accessories used by a golfer, such as towels, gloves, sweaters, score pads and cigarettes. The cover 104 is also provided with a plurality of golf ball pockets 118 on the inner face thereof, as illustrated in FIG. 7. The pockets 118 are so arranged to extend between adjacent tubes 26 of the forwardmost row of tubes 26, such that the pockets 118 only occupy space within the cover 104 which is not otherwise utilized. The pockets 118 may be of any desired length to contain the desired number of golf balls and are provided with suitable fasteners, such as zippers 120 in the cover 104, for easy and convenient access by the golfer.

*Operation*

As previously indicated, a set of golf clubs are stored in the tubes 26 with the grips and handles being inserted in the tubes 26, and the heads of the clubs will protrude above the top plate 14. As also previously indicated, the four woods of a set of golf clubs are stored in the foremost or forward row of tubes 26 and the irons of a set of golf clubs are stored in the next two rows of tubes 26, where the clubs will be most conveniently arranged for the golfer, and the golfer has ready access to any desired club of the set.

When the present golf cart is stored or being transported in an automobile or the like, the wheel mechanism 12 is retracted as illustrated in FIG. 2, with the axle mountings 60 in contact with the stop member 82, and with the wheels 42 positioned along the opposite sides of the back member 10 and along the opposite sides of the lower plate 16, as illustrated in dashed lines in FIG. 5. In this position of the wheels and the wheel mechanism, the golf cart will occupy a minimum of space. It may also be noted that the handle 88 may be swung downwardly (not shown) upon loosening of the wing nut 98 to further minimize the storage space required for the golf cart.

When it is desired to use the golf cart, the cart is placed in a vertical position, as illustrated in FIG. 1, with the foot piece 36 resting on the ground or on a suitable supporting surface. In this connection, it may be noted that the handle 30 and foot piece 36 may be easily gripped by the golfer to handle the golf cart in any easy and convenient manner. Ordinarily, the wing nut 98 is first loosened and the handle 88 swung upwardly to the desired angle from the back member 10; whereupon the wing nut 98 is again tightened to engage the serrations on the mating faces 94 and 96 of the handle connectors 90 and handle brackets 86, as illustrated in FIG. 3. The cart may then be pulled or pushed on the wheels 42, if desired. However, it is usually desirable to proceed with expanding the wheels 42 to the positions shown in FIGS. 1, 4 and 5 prior to pulling the cart, since the cart has substantially more stability when the wheels are in an expanded position.

In order to expand the wheels 42, the golfer merely holds the cart in a vertical position on the foot piece 36, as shown in FIG. 1, and then steps on the flange 72 of the wheel actuating block 70. The downward movement of the wheel actuating block 70 pivots the trusses 64 in a clockwise direction (as viewed in FIG. 1) and pivots the tubes 48 and 50 outwardly and rearwardly from the back member 10. It should be noted here that during the initial downward movement of the wheel actuating block 70, the trusses 64, being extended slightly rearward, will provide a rearward force component, whereby a minimum force is required to start the rearward movement of the wheels. Thus, the trusses 64 and tubes 48 and 50 may be made as long as desired to increase the stability of the cart, without unduly increasing the effort required to expand the wheels.

As the wheel actuating block 70 approaches the lower stop member 82, the trusses 64 move through horizontal positions and are then extended slightly downwardly and forwardly from the axle mountings 60 when the wheel actuating block 70 comes into contact with the stop member 82. Therefore, the trusses 64 are moved "over center" with respect to the axle mountings 60, and any tendency for the wheels 42 to move forwardly toward the back member 10 will merely force the wheel actuating block 70 against the stop member 82. As a result, the wheels 42 are locked in their expanded positions. The golf cart is then ready for use.

As it is well known in the art, a golfer is frequently required to wait at various points along a golf course for such things as slow players ahead. During these waiting periods, it is highly desirable that the golfer have a place to sit, other than on the ground, without the necessity of carrying a separate seat along with his golf cart. When utilizing the present golf cart construction, the golfer merely tilts the cart rearwardly until the cart rests on the wheels 42 and the handle 88. It will be appreciated that the disposition of the cart at this time will depend upon the angle at which the handle 88 extends from the back member 10, as well as upon the length of the handle 88. However, in a normal situation, the cart will be disposed substantially horizontally as illustrated in FIG. 8 when the cart rests on the wheels 42 and the handle 88. The golfer can then conveniently sit on the seat plate 40 and the major portion of the weight of the golfer will be transmitted through the plates 16 and 18, the back member 10, and the trusses 64 to the wheels 42. It should also be noted here that no weight is imposed on the tubes 26. By utilizing the two trusses 64 of substantially V-shaped construction and pivotally secured to the back member 10 on axes extending at substantially right angles to the back member 10, the weight of the golfer is efficiently transferred to the wheels 42 without overloading the cart and without damage to any portion of the cart. It may also be noted that sweaters and the like are ordinarily stored in the large pocket 114 directly above the seat plate 40, such that the golfer will have a comfortable seat. When the golfer is ready to proceed, he merely lifts upwardly on the handle 88 and the cart is ready for use.

When it is desired to again store the golf cart or transport the golf cart in an automobile or the like, the golfer merely supports the cart in a vertical position on the foot piece 36, as illustrated in FIG. 1. The golfer then places the toe of one shoe underneath the flange 72 of the wheel actuating block 70 and lifts upwardly; whereupon the trusses 64 will be pivoted in a counter-clockwise direction as viewed in FIG. 1 and the wheels 42 are retracted to the dashed line positions illustrated in FIG. 5. When the wheels 42 are retracted, the wheel mechanism 12 will be in the position shown in FIG. 2 with the tubes 48 and 50 extending vertically, parallel to the back member 10, and with the trusses 64 extending downward and slightly rearwardly from the back member 10. It may also be noted here that in this condition of the cart, the wheels 42 are at their lowest position and will tend to remain alongside the back member 10 and the lower plate 16; therefore, no separate lock or latch is required to retain the wheels adjacent the back member 10. The golfer then loosens the wing nut 98 and swings the handle 88 downwardly into parallel relation with respect to the back member 10 and the cart is ready for storage or transportation.

From the foregoing, it will be apparent that the present invention provides a novel golf cart construction having a collapsible wheel mechanism which may be easily operated. Since the trusses are extended downwardly and slightly rearwardly when the wheels are in a collapsed position, a downward force imposed upon these trusses will have a rearward component for initiating the rearward movement of the wheels with a minimum of effort. The wheel mechanism can be operated by a golfer using one foot, either to expand or retract the wheels. It will be apparent that the present invention provides a novel combination golf bag and cart construction which forms a convenient seat for the golfer, without the necessity of increasing the overall size of the cart in any respect and yet permitting use of cheap and light-weight club supporting tubes. The wheel mechanism of the cart has the maximum strength and stability for supporting the weight of the golfer when the cart is used as a seat and for maintaining the cart in an upright position when the cart is pulled or pushed over rough terrain. Furthermore, it will be apparent that the present invention provides a novel combination golf bag and cart wherein the golf clubs will be held in the most convenient positions for access by the golfer and the grips of the clubs will be not only protected from contact with one another but also will be protected from contact by outside forces, to minimize the possibility of damaging the clubs during transportation thereof. It will further be apparent that the present invention provides a novel golf cart which is simple in construction, may be economically manufactured and which will have a long service life.

Changes may be made in the combination and arrangement of parts or elements as heretofore set forth in the specification and shown in the drawings, it being understood that changes may be made in the embodiment disclosed without departing from the spirit and scope of the invention as defined in the following claims:

I claim:
1. A golf cart, comprising a top plate; a bottom plate; an intermediate plate positioned between the top and bottom plates; each of said plates having side edges, front edges and rear edges; a single vertically extending support member secured along the rear edges of said plates and retaining said plates in vertically spaced relation; said top and intermediate plates having a plurality of aligned openings therein; tubes seated in said openings and against the bottom plate for receiving golf clubs; a handle secured to the upper end portion of the support member and extending rearwardly from said support member; wheels secured to the lower end portion of the support member and extending rearwardly from said support member, and a plate secured to the front edges of the intermediate and bottom plates to form a seat when the cart is tilted to rest on the handle and wheels.

2. A golf cart as defined in claim 1 wherein said support member is in the form of an extrusion having a plurality of forwardly projecting flanges extending along the length thereof between the top and bottom plates, and said intermediate plate having slots therein receiving said projecting flanges, said projecting flanges being arranged to extend between the tubes positioned adjacent the support member.

3. A golf cart as defined in claim 1 wherein said tubes are fourteen in number and are arranged in three rows spaced forwardly from the support member with four tubes in the forward-most row to support the woods of a set of golf clubs, and five tubes in each of the remaining two rows to support the irons of the set of golf clubs.

4. A golf cart as defined in claim 3 characterized further to include a fabric-like cover secured around the edges of said plates and over the rear of the support member for covering the portions of the tubes extending between said plates, and a plurality of elongated pockets on the inner surface of said cover positioned to extend between adjacent tubes of the forwardmost row of tubes for the storage of golf balls and the like.

5. In a golf cart or the like, the combination of: a substantially vertically extending back member having a front face and a rear face; a pair of spaced wheels; an axle mounting for each wheel; first brace means pivotally connected to the back member and to each of said axle mountings for guiding the axle mountings rearwardly and outwardly from the back member and, alternately, inwardly and forwardly toward the back member; a foot piece carried at the lower end of the back member for supporting the cart on a supporting surface with the wheels removed from the supporting surface when the back member is held vertical; a wheel actuating block; means slidingly securing the wheel actuating block to the back member for movement of the wheel actuating block vertically along the back member; and second brace means pivotally connected to the wheel actuating block and to each axle mounting for moving the wheels rearwardly and, alternately, forwardly upon sliding of the block downwardly and, alternately, upwardly along the back member, each of said second brace means being pivotally connected to the wheel actuating block at a point forwardly of the pivotal connection thereof to the respective axle mounting when the axle mountings are adjacent the back member and the back member is extended vertically, to provide a rearward component of force on the axle mountings when the wheel actuating block is initially moved downwardly along the back member, each of said first brace means comprising a pair of tubes pivotally secured to the back member and to the respective axle mounting in parallel relation, and each of said second brace means comprising a V-shaped truss pivotally connected to the wheel actuating block and to the respective axle mounting with the larger end of the truss connected to the wheel actuating block along an axis extending in a substantially horizontal plane.

6. A golf cart as defined in claim 5 wherein said wheel actuating block is positioned below the connections of the first brace means to the back member, and said tubes comprising said first brace means are of equal lengths.

7. A golf cart as defined in claim 6 wherein each pair of said tubes are connected to the back member and the axle mounting with one tube rearwardly of the other tube, the rearmost tube of each pair of tubes being connected to the back member at a point higher than the mating forwardmost tube, the smaller end of each of said trusses being connected to the respective axle mounting on the same axis as the rearmost tube of the corresponding pair of tubes, and the larger end of each of said trusses being connected to the wheel actuating block directly below the connection of the forwardmost tube of the respective pair of tubes.

8. A golf cart as defined in claim 5 wherein said means slidingly securing the wheel actuating block to the back member comprises a pair of vertically extending slide rods secured to the rear face of the back member in horizontally spaced relation, and wherein said wheel actuating block has a pair of spaced bores therethrough slidingly receiving said slide rods to slidingly secure the wheel actuating block to the back member.

9. A golf cart as defined in claim 8 wherein said slide rods are secured to the back member at the upper and lower ends thereof by upper and lower support members between which the wheel actuating block is moved at its extreme upper and lower positions, said lower support member being so positioned that the wheel actuating block is below the center of said wheels when the wheel actuating block is against the lower support member and the back member is extended vertically, to lock the wheels in their rearmost positions.

10. A golf cart as defined in claim 5 characterized further to include a U-shaped handle secured to the back member above said first brace means and extending rearwardly from the back member to cooperate with the wheels in supporting the back member when the back member is tilted rearwardly, and a seat plate carried by the back member parallel to the back member in a position directly above the wheels when the back member is tilted rearwardly to a substantially horizontal position.

11. A golf cart as defined in claim 10 wherein each of said second brace means comprises a V-shaped truss and said trusses are positioned directly below said seat plate when the back member is tilted rearwardly to a horizontal position, to transfer the load on the seat plate to the wheels.

References Cited in the file of this patent

UNITED STATES PATENTS

| | | |
|---|---|---|
| D. 170,636 | Gastright | Oct. 20, 1953 |
| 2,482,372 | Rossow | Sept. 20, 1949 |
| 2,518,803 | Marvin | Aug. 15, 1950 |
| 2,538,374 | May | Jan. 16, 1951 |
| 2,681,232 | Womack | June 15, 1954 |
| 2,743,115 | Rutledge | Apr. 24, 1956 |
| 2,761,691 | George | Sept. 4, 1956 |
| 2,799,315 | Strasburg | July 16, 1957 |
| 2,810,586 | Troka | Oct. 22, 1957 |
| 2,879,073 | Van Voorhees | Mar. 24, 1959 |
| 2,914,336 | Hibben | Nov. 24, 1959 |